United States Patent
Toma

(10) Patent No.: US 8,335,648 B2
(45) Date of Patent: Dec. 18, 2012

(54) ROUTE SEARCHING SYSTEM, ROUTE SEARCHING SERVER AND ROUTE SEARCHING METHOD

(75) Inventor: Junji Toma, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 0 days.

(21) Appl. No.: 13/139,211

(22) PCT Filed: Dec. 12, 2008

(86) PCT No.: PCT/JP2008/072689
§ 371 (c)(1),
(2), (4) Date: Jun. 10, 2011

(87) PCT Pub. No.: WO2010/067458
PCT Pub. Date: Jun. 17, 2010

(65) Prior Publication Data
US 2011/0246054 A1    Oct. 6, 2011

(51) Int. Cl.
*G01C 21/34* (2006.01)
(52) U.S. Cl. .................... 701/533; 701/117; 340/994
(58) Field of Classification Search .............. 701/117, 701/410, 465, 533; 340/994
See application file for complete search history.

(56) References Cited

U.S. PATENT DOCUMENTS

| | | | |
|---|---|---|---|
| 6,349,261 B1 | 2/2002 | Ohnishi et al. | |
| 6,366,834 B1* | 4/2002 | Hayes et al. | 701/1 |
| 2003/0074133 A1* | 4/2003 | McKinley et al. | 701/202 |
| 2004/0148098 A1* | 7/2004 | Yato | 701/209 |
| 2004/0249568 A1* | 12/2004 | Endo et al. | 701/209 |
| 2005/0206534 A1* | 9/2005 | Yamane et al. | 340/994 |
| 2005/0288855 A1* | 12/2005 | Sano | 701/209 |

(Continued)

FOREIGN PATENT DOCUMENTS

AT    232969 T    3/2003

(Continued)

OTHER PUBLICATIONS

Notification of Transmittal of Translation of the International Preliminary Report on Patentability (Form PCT/IB/388) of International Application No. PCT/JP2008/072689 mailed Jul. 14, 2011 with Forms PCT/IB/373, PCT/ISA/237 and PCT/IB/326.

(Continued)

*Primary Examiner* — Helal A Algahaim
(74) *Attorney, Agent, or Firm* — Westerman, Hattori, Daniels & Adrian LLP

(57) ABSTRACT

It is an object to provide a route searching system that can easily carry out the search processing of a route covering different time zones. A route searching system is provided with a time zone data memory means that stores information of a time zone which is associated with each node composing a traffic network and to which a node belongs, a reference time table data memory means that stores reference time table data made out by using a predetermined reference time irrelevant to the time zone to which the node belongs, a time zone determination means that determines the time zone to which the starting point or destination point belongs and a time conversion means, wherein a route searching means searches for a route from the starting point to the destination point based on the traffic network data and the reference time table data, the time conversion means converts the time data of the searched route into guiding data based on the time zone to which the starting point or the destination point belongs.

12 Claims, 11 Drawing Sheets

U.S. PATENT DOCUMENTS

2006/0287818 A1* 12/2006 Okude et al. .................. 701/209
2007/0162222 A1* 7/2007 Endo et al. .................... 701/209
2008/0208453 A1* 8/2008 Fujimoto ....................... 701/202

FOREIGN PATENT DOCUMENTS

| DE | 60001429 T | 7/2003 |
|---|---|---|
| DE | 102004003375 A | 8/2004 |
| EP | 1035403 A | 9/2000 |
| JP | 2000-258184 A | 9/2000 |
| JP | 2001-165681 A | 6/2001 |
| JP | 2003-231468 A | 8/2003 |
| JP | 2004-226302 A | 8/2004 |
| JP | 2005-121425 A | 5/2005 |
| JP | 2008-164436 A | 7/2008 |

OTHER PUBLICATIONS

International Search Report of PCT/JP2008/072689, mailing date Jan. 13, 2009.

* cited by examiner

ROUTE SEARCHING SYSTEM, ROUTE SEARCHING SERVER AND ROUTE SEARCHING METHOD

TECHNICAL FIELD

The present invention relates to a route-searching system for searching and providing guidance for a route that includes a route interval that uses a transportation system from any departure point to a destination point, and particularly relates to a route-searching system provided with route-searching network data that include transportation network data for searching for a route interval using a transportation system, and reference time table data in which time table information of the transportation systems belonging to a different time zone is converted based on a specific reference time, wherein a route from a departure point to a destination point is searched on the basis of the reference time table data and the route-searching network data in the case that the departure point and the destination point span different time zones.

BACKGROUND ART

There are known in the art navigation devices and navigation systems for searching for a route from a desired departure point to a departure point using map data and road data to provide guidance to a user. Such navigation devices and navigation systems that have been implemented include navigation devices mounted in an automobile and used for providing route guidance to the driver, and communication-type navigation systems that send a route searching request to a route searching server using a cellular telephone as a navigation terminal and receive the result to received route guidance.

In particular, a communication-type navigation system is a system in which a cellular telephone or another mobile terminal is used as a navigation terminal, and which is also used as a navigation system for a pedestrian. The navigation system for a pedestrian preferably has a route guidance function that includes transportation systems, and there are also navigation systems that keep transportation system lines and operating time data in a route searching server, and in addition to searching and providing guidance for a walking route, have a function for providing route guidance (candidate train for boarding) from a desired departure station to a desired destination station in addition to searching and providing guidance for a walking route. There are also transportation guidance systems for receiving delivery of and displaying transportation lines, time tables, boardable trains, and other information from an information delivery server that does not include route searching for a walking route.

A common navigation device, route-searching device using in a communication-type navigation system, and route-searching means are disclosed in, e.g., Patent Reference 1 (Japanese Laid-open Patent Application No. 2001-165681). This navigation system is configured so as to send departure point and destination point information from a portable navigation terminal to an information delivery server, and to search for and provide guidance for a route that matches the search conditions from road network and transportation network data in the information delivery server. Examples of the search conditions that may be used as one of the search conditions include movement means from the departure point to the destination point, e.g., walking, automobile, and railroad in combination with walking.

The information delivery server is provided with link cost information (distance and required time) of all links as a database in which the connecting points and curve points of the roads (routes) of the map data are nodes and routes that connect the nodes are links. The information delivery server is capable of referring to the database, sequentially searching for a link that reaches from the departure point node to the destination point node, and providing guidance about the shortest route to the portable navigation terminal by following the nodes and links that minimize the link cost information to obtain a guidance route. A technique referred to as the label determination method or the Dijkstra method is used as the route searching technique. A route-searching method that uses the Dijkstra method is disclosed in Patent Reference 1.

An invention related to a route-searching system is disclosed in Patent Reference 2 (Japanese Laid-open Patent Application No. 2000-258184) in which the rectilinear distance from the departure point and the destination point to the station of the transportation system to be used and the rectilinear distance from the destination point to the station of the transportation system to be used are calculated using the latitude and longitude information, the average cost is calculated using the rectilinear distance as a variable, and all of the stations of the transportation systems included in the range of costs specified in the average cost are obtained to determine a walking route.

Route-searching systems for searching routes using transportation systems are provided with an operation timetable database in which operation timetable data of transportation systems have been organized into a database on the basis of departure time, departure point, destination point, arrival time, and other route searching conditions designated by the user; and are provided with data in which the transportation network has been organized into a database on the basis of the above. The route-searching systems are configured to reference these databases, connect a departure point and a destination point while including transit changes (transfers), sequentially follow usable transportation means (individual trains and shuttle buses) as a route, and present one or a plurality of candidates for route guidance (departure station, destination station, course, train, and other transportation means) that matches the route searching conditions. Route searching conditions that can be designated commonly further include required time, number of transit changes, fares, and other conditions.

Guidance systems have also been proposed for carrying out retrieval and guidance related to transportation systems in which a cellular telephone or another terminal connects to an information delivery server that provides guidance related to line information and time table information of transportation systems; specifies a desired departure station, departure time, destination station, or the like; receives delivery of information about boardable lines, trains, trams, and other transportation means; and displays the information on the terminal device. Generally, when such use is carried out using a terminal device, a configuration used in which the URL (uniform resource locator), domain name, or the like for specifying the location of information desired for download is inputted in the terminal device, an information delivery server (information site) specified by the address is accessed, and the desired information is downloaded.

Route search data in a navigation system or the like that performs a route search or provides route guidance that makes use of a transportation system has stations on a transportation line as nodes and station-to-station intervals as bidirectional links in the same manner as road network data in a navigation system for a vehicle or a navigation system for a pedestrian, and the nodes and links are organized as network data. Additionally, the operating times and required time of each link are added as link cost data for each transportation means operated on a transportation line. There are also systems that furthermore add fare data and provide guidance together with the fare for the guidance route that has been searched.

The earth is divided into time zone regions as reference times based on Greenwich Mean Time (GMT), and time table data of transportation systems are created using the local time (time that includes time difference from GMT) in accordance with the time zone of each region. A common route-searching system assumes that route searches are essentially carried out in a single time zone, the case in which the departure point and destination point belong to different time zones not being taken into account.

In other words, in the case that the time zones of the departure point and the destination point are different, a problem is presented in that the destination point arrival time is not displayed in the time referenced by the time zone to which the destination point belongs in the case that the departure point time has been set and a search carried out using the common route-searching system described above; and conversely, the departure time is not displayed in the time referenced by the time zone to which the departure point belongs in the case that the destination point arrival time has been set and a search has been carried out.

In regard to movement means such as a train in which the departure point and destination point are established, a route search is carried out using different reference time data, i.e., time data in which the time zone to which the departure point belongs is used as a reference, and time data in which the time zone to which the destination point belongs is used as a reference. Therefore, a problem is presented in the process of searching for a route in that the route search must be carried out while determining the time zone of each node (a point on the route) and converting the time between different time zones in the case that the route spans different time zones; and the route search cannot be easily carried out.

An example of a route-searching system in which consideration is given to differences in time zones is disclosed in Patent Reference 3 (Japanese Laid-open Patent Application No. 2005-121425) as an invention of an onboard navigation device. Even if a road exists on a guidance route that involves travel time restrictions and the road belongs to a time zone different from the departure point, the onboard navigation device disclosed in Patent Reference 3 is capable of converting the restricted time using the time difference to carry out a route search.

In other words, the onboard navigation device has a storage device for storing link data that includes the time restriction information of the links constituting a road on a map, and map data that includes time zone information for determining the time zone to which the links belong. The departure point and destination point are set and a recommended route is searched from the departure point to the destination point using the map data. The route search is configured to exclude links having time restrictions in terms of the estimated time of arrival at the link on the basis of the time restriction information and the time zone information. A link that spans different time zones is handled as a plurality of links divided along a time zone boundary so that the links do not span different time zones.

[Patent Reference 1]
Japanese Laid-open Patent Application No. 2001-165681 (FIGS. 1 and 2)
Japanese Laid-Open Patent Application No. 2000-258184 (FIGS. 4 and 6)
Japanese Laid-Open Patent Application No. 2005-121425 (FIGS. 10 and 11)

DISCLOSURE OF THE INVENTION

Problems the Invention is Intended to Solve

However, in the method disclosed in Patent Reference 3, a time zone cannot be specified for links that span different time zones. Therefore, a problem is presented in that a new node must be disposed on the boundary of the time zones to divide the link, network data must be created together with the information indicating the time zones to which each link belongs, and existing network data for a route search cannot be used.

In the particular case that a route including a route interval that makes use of a transportation system is searched, the links are expressed as link data that differ for each individual transportation means such as trains, aircraft, ships, and the like that are operated in accordance with time table data. Therefore, a problem is presented in that the number of links to be divided is dramatically increased, resulting in a large amount of data.

In the process of carrying out a route search, a route search must be carried out while determining the time zone to which a node and link belong when nodes and links are followed. In other words, a problem is presented in that a route search must be carried out while the time difference is computed and there is an increase in the route search processing load when an immediately prior node and link belong to a different time zone from the next node and link.

Furthermore, in the case that the technique disclosed in Patent Reference 3 is used, the time zone to which a node belongs can be specified because the time zone information is added to the links connected to the nodes, in the case that a node is designated in the setting of the departure point or the destination point. However, a problem is presented in that information for determining the time zone to which the point thus set belongs is required when a desired point is designated by latitude and longitude, or a desired POI (point of interest) is selected and designated.

The inventor of the present invention, as a result of thoroughgoing research to solve the problems described above, devised a route-searching system configured so as to use transportation network data in which transportation systems are expressed as links connecting nodes together, reference-time time table data created using a predetermined reference time without dependence on the time zone to which a node belongs, and time zone data associated with the time zone to which each node belongs; to search for a route from a departure point to the destination point using the transportation network data and the reference-time time table data; and to convert time data at a departure point or a destination point of the route searched on the basis of the time zone to which the departure point or the destination point belongs and obtain guidance route data.

In other words, an object of the present invention is to solve the problems described above and to provide a route-searching system that can readily carry out search processing for a route that spans different time zones using a simple configuration. Another object is to provide a route-searching system that makes it possible to readily specify a time zone to which a departure point or a destination point belongs in the case that a point that is not a node of the transportation network data has been set as the departure point or the destination point as a route searching condition.

Means for Solving the Abovementioned Problems

In order to overcome these drawbacks, a first aspect of the present invention is a route-searching system having route-searching network data memory means for storing transportation network data made of nodes and links connecting the nodes, point setting means for setting a departure point and a destination point, and route-searching means for searching for a route from the departure point to the destination point using the transportation network data, the route-searching system characterized in that the route-searching system comprises time zone data memory means for storing time zone information which is associated with the nodes constituting the transportation network and to which the nodes belong; reference-time time table data memory means for storing reference-time time table data which is time table data of a transportation system, and which is created using a predetermined reference time irrespective of the time zone to which the node belongs; time zone determination means for determining the time zone to which the departure point or the destination point belongs; and time conversion means, wherein the route-searching means searches for a route from the departure point to the destination point on the basis of the transportation network data and the reference-time time table data; and the time conversion means converts the time data of the searched route into guidance route data on the basis of the time zone to which the departure point or the destination point belongs.

A second aspect of the present invention is the route-searching system of the first aspect, characterized in that the route-searching system comprises node retrieval means for retrieving the closest node, which is nearest in distance from a point set by the point setting means; the time zone determination means is configured so as to include closest node time zone acquisition means for referencing time zone data stored in the time zone data memory means and acquiring the time zone of the closest node retrieved by the node retrieval means; and, in a case that a point other than the node has been set as the departure point or the destination point, the point setting means determines the time zone of the closest node acquired by the closest node time zone acquisition means to be the time zone of the point thus set.

A third aspect of the present invention is the route-searching system of the first aspect, characterized in that the route-searching system comprises node retrieval means for retrieving a nearby node, which is in a position relatively near to the point set by the point setting means; the time zone determination means is configured so as to include nearby-node time zone acquisition means for referencing time zone data stored in the time zone data memory means and acquiring the time zone of a nearby node retrieved by the node retrieval means; and, in a case that a point other than the node has been set as the departure point or the destination point, the point setting means determines the time zone that is most numerous among the time zones of the nearby nodes acquired by the nearby-node time zone acquisition means to be the time zone of the point thus set.

A fourth aspect of the present invention is the route-searching system of the second aspect, characterized in that the route-searching system comprises node retrieval means and node extraction means, the node retrieval means retrieving the closest node and retrieving a nearby node, which is in a position relatively near to the point set by the point setting means; the node extraction means compares the time zone of the nearby node retrieved by the node retrieval means and the time zone of the point determined by the time zone determination means, and extracts the nearby node that belongs to the same time zone as the time zone of the point determined by the time zone determination means; and the route-searching means carries out a route search using the nearby node extracted by the node extraction means as the starting point or end point of a route interval search that makes use of the transportation network.

A fifth aspect of the present invention is the route-searching system of the third aspect, characterized in that the route-searching system comprises node extraction means, wherein the node extraction means compares the time zone of the nearby node retrieved by the node retrieval means and the time zone of the point determined by the time zone determination means, and extracts a nearby node that belongs to the same time zone as the time zone of the point determined by the time zone determination means; and the route-searching means carries out a route search using the nearby node extracted by the node extraction means as the starting point or end point of a route interval search that makes use of the transportation network.

A sixth aspect of the present invention is the route-searching system of the first aspect, characterized in that the route-searching system comprises node retrieval means for retrieving a nearby node within a predetermined distance range relatively near to the point set by the point setting means; and the route-searching means carries out a route search in which all nearby nodes retrieved by the node retrieval means are used as the starting point or end point of a route interval search that makes use of the transportation network.

A seventh aspect of the present invention is a route-searching server having route-searching network data memory means for storing transportation network data made of nodes and links joining the nodes, point setting means for setting a departure point and a destination point, and route-searching means for searching for a route from the departure point to the destination point using the transportation network data, the route-searching server characterized in that the route-searching server comprises time zone data memory means for storing time zone information which is associated with the nodes constituting the transportation network and to which the nodes belong; reference-time time table data memory means for storing reference-time time table data, which is time table data of a transportation system and which is created using a predetermined reference time irrespective of the time zone to which the node belongs; time zone determination means for determining the time zone to which the departure point or the destination point belongs; and time conversion means, wherein the route-searching means searches for a route from the departure point to the destination point on the basis of the transportation network data and the reference-time time table data; and the time conversion means converts the time data of the route thus searched into guidance route data on the basis of the time zone to which the departure point or the destination point belongs.

An eighth aspect of the present invention is the route-searching server of the seventh aspect, characterized in that the route-searching server comprises node retrieval means for retrieving the closest node, which is nearest in distance from a point set by the point setting means; the time zone determination means is configured so as to include closest node time zone acquisition means for referencing time zone data stored in the time zone data memory means and acquiring the time zone of the closest node retrieved by the node retrieval means; and, in a case that a point other than the node has been set as the departure point or the destination point, the point setting means determines the time zone of the closest node acquired by the closest node time zone acquisition means to be the time zone of the point thus set.

A ninth of the present invention is the route-searching server of the seventh aspect, characterized in that the route-searching server comprises node retrieval means for retrieving a nearby node, which is in a position relatively near to the point set by the point setting means; the time zone determination means is configured so as to include nearby-node time zone acquisition means for referencing time zone data stored in the time zone data memory means and acquiring the time zone of the nearby node retrieved by the node retrieval means; and, in a case that a point other than the node has been set as the departure point or the destination point, the point setting means determines the time zone that is most numerous among the time zones of the nearby nodes acquired by the nearby-node time zone acquisition means to be the time zone of the point thus set.

A tenth aspect of the present invention is the route-searching server of the eighth aspect, characterized in that the route-searching server comprises node retrieval means and node extraction means, the node retrieval means retrieving the closest node and retrieving a nearby node, which is in a position relatively near to the point set by the point setting means; the node extraction means compares the time zone of the nearby node retrieved by the node retrieval means and the time zone of the point determined by the time zone determination means, and extracts the nearby node that belongs to the same time zone as the time zone of the point determined by the time zone determination means; and the route-searching means carries out a route search using the nearby node extracted by the node extraction means as the starting point or end point of a route interval search that makes use of the transportation network.

An eleventh aspect of the present invention is the route-searching server of the ninth aspect, characterized in that the route-searching server comprises node extraction means, wherein the node extraction means compares the time zone of the nearby node retrieved by the node retrieval means and the time zone of the point determined by the time zone determination means, and extracts a nearby node that belongs to the same time zone as the time zone of the point determined by the time zone determination means; and the route-searching means carries out a route search using the nearby node extracted by the node extraction means as the starting point or end point of a route interval search that makes use of the transportation network.

A twelfth aspect of the present invention is the route-searching server of the seventh aspect, characterized in that the route-searching server comprises node retrieval means for retrieving a nearby node, which is within a predetermined distance range relatively near to the point set by the point setting means; and the route-searching means carries out a route search in which all nearby nodes retrieved by the node retrieval means are used as the starting point or end point of a route interval search that makes use of the transportation network.

A thirteenth aspect of the present invention is a route-searching method in a route-searching server having route-searching network data memory means for storing transportation network data made of nodes and links connecting the nodes, point setting means for setting a departure point and a destination point, and route-searching means for searching for a route from the departure point to the destination point using the transportation network data, the route-searching method characterized in comprising:

the route-searching server having time zone data memory means for storing time zone information which is associated with the nodes constituting the transportation network and to which the nodes belong; reference-time time table data memory means for storing reference-time time table data which is time table data of a transportation system and which is created using a predetermined reference time without dependence on the time zone to which the node belongs; time zone determination means for determining the time zone to which the departure point or the destination point belongs; and time conversion means;

a step in which the route-searching means searches for a route from the departure point to the destination point on the basis of the transportation network data and the reference-time time table data; and a step in which the time conversion means converts the time data of the route thus searched into guidance route data on the basis of the time zone to which the departure point or the destination point belongs.

A fourteenth aspect of the present invention is the route-searching method of the thirteenth aspect, characterized in comprising:

the route-searching server having node retrieval means for retrieving the closest node, which is nearest in distance from a point set by the point setting means;

the time zone determination means being configured so as to include closest node time zone acquisition means for referencing time zone data stored in the time zone data memory means and acquiring the time zone of the closest node retrieved by the node retrieval means; and a step in which, in a case that a point other than the node has been set as the departure point or the destination point, the point setting means determines the time zone of the closest node acquired by the closest node time zone acquisition means to be the time zone of the point thus set.

A fifteenth aspect of the present invention is the route-searching method of the thirteenth aspect, characterized in comprising:

the route-searching server having node retrieval means for retrieving a nearby node, which is in a position relatively near to the point set by the point setting means;

the time zone determination means being configured so as to include nearby-node time zone acquisition means for referencing time zone data stored in the time zone data memory means and acquiring the time zone of the nearby node retrieved by the node retrieval means;

a step in which, in a case that a point other than the node has been set as the departure point or the destination point, the point setting means determines the time zone that is most numerous among the time zones of the nearby nodes acquired by the nearby-node time zone acquisition means to be the time zone of the point thus set.

A sixteenth aspect of the present invention is the route-searching method of the fourteenth aspect, characterized in comprising:

the route-searching server having node retrieval means and node extraction means, the node retrieval means retrieving the closest node and retrieving a nearby node in a position relatively near to the point set by the point setting means;

a step in which the node extraction means compares the time zone of the nearby node retrieved by the node retrieval means and the time zone of the point determined by the time zone determination means, and extracts the nearby node that belongs to the same time zone as the time zone of the point determined by the time zone determination means; and a step in which the route-searching means carries out a route search using the nearby node extracted by the node extraction means as the starting point or end point of a route interval search that makes use of the transportation network.

A seventeenth aspect of the present invention is the route-searching method of the fifteenth aspect, characterized in comprising:

the route-searching server having node extraction means;

a step in which the node extraction means compares the time zone of the nearby node retrieved by the node retrieval means and the time zone of the point determined by the time zone determination means, and extracts a nearby node that belongs to the same time zone as the time zone of the point determined by the time zone determination means; and a step in which the route-searching means carries out a route search using the nearby node extracted by the node extraction means as the starting point or end point of a route interval search that makes use of the transportation network.

An eighteenth aspect of the present invention is the route-searching method of the thirteenth aspect, characterized in comprising:

the route-searching server having node retrieval means for retrieving a nearby node within a predetermined distance range relatively near to the point set by the point setting means; and a step in which the route-searching means carries out a route search in which all nearby nodes retrieved by the node retrieval means are used as the starting point or end point of a route interval search that makes use of the transportation network.

Effect of the Invention

The first aspect is a route-searching system having route-searching network data memory means for storing transportation network data made of nodes and links connecting the nodes, point setting means for setting a departure point and a destination point, and route-searching means for searching for a route from the departure point to the destination point using the transportation network data, the route-searching system characterized in that the route-searching system comprises time zone data memory means for storing time zone information which is associated with the nodes constituting the transportation network and to which the nodes belong; reference-time time table data memory means for storing reference-time time table data which is time table data of a transportation system, and which is created using a predetermined reference time irrespective of the time zone to which the node belongs; time zone determination means for determining the time zone to which the departure point or the destination point belongs; and time conversion means, wherein the route-searching means searches for a route from the departure point to the destination point on the basis of the transportation network data and the reference-time time table data; and the time conversion means converts the time data of the searched route into guidance route data on the basis of the time zone to which the departure point or the destination point belongs.

In accordance with this configuration, there is no need to dispose a new node on a time zone boundary to divide a link and to create network data together with information indicating the time zones to which the links belong. Also, the data is expressed as link data that differs for trains, aircraft, ships, and other individual transportation means, but the amount of data can be reduced because there is no need to divide the links by time zone. Also, in the procedure of carrying out a route search, there is no need to carry out a route search while determining the time zone to which a node and link belong each time a node or link is followed. In other words, there is no need to carry out a route search while computing the time difference and there is also no increase in the route search processing load, even when an immediately prior node and link belong to a different time zone from the next node and link.

The second aspect is the route-searching system of the first aspect, wherein the route-searching system comprises node retrieval means for retrieving the closest node, which is nearest in distance from a point set by the point setting means; the time zone determination means is configured so as to include closest node time zone acquisition means for referencing time zone data stored in the time zone data memory means and acquiring the time zone of the closest node retrieved by the node retrieval means; and, in a case that a point other than the node has been set as the departure point or the destination point, the point setting means determines the time zone of the closest node acquired by the closest node time zone acquisition means to be the time zone of the point thus set.

In accordance with this configuration, the route-searching server extracts the node of the nearest station in the vicinity of a point that has been set, acquires the time zone of the extracted node, and determines the time zone of the departure point and the destination point in the case that the departure point and the destination point set as the route searching conditions are not nodes, i.e., a railroad station or an airport for an airline in a transportation network. Therefore, the start point and end point of the route interval that uses a transportation system and the time zones to which these points belong can be determined even in the case that an arbitrary point has been set as the departure point or the destination point.

The third aspect of the present invention is the route-searching system of the first aspect, wherein the route-searching system comprises node retrieval means for retrieving a nearby node, which is in a position relatively near to the point set by the point setting means; the time zone determination means is configured so as to include nearby-node time zone acquisition means for referencing time zone data stored in the time zone data memory means and acquiring the time zone of a nearby node retrieved by the node retrieval means; and, in a case that a point other than the node has been set as the departure point or the destination point, the point setting means determines the time zone that is most numerous among the time zones of the nearby nodes acquired by the nearby-node time zone acquisition means to be the time zone of the point thus set.

In accordance with this configuration, the route-searching server extracts the node of the nearest station in the vicinity of a point that has been set, acquires the time zone of the extracted node of the nearest station in the vicinity, and determines the time zone of the departure point and the destination point in the case that the departure point and the destination point set as the route searching conditions are not nodes, i.e., a railroad station or an airport for an airline in a transportation network. Therefore, the start point and end point of the route interval that uses a transportation system and the time zones to which these points belong can be determined even in the case that an arbitrary point has been set as the departure point or the destination point.

The fourth aspect of the present invention is the route-searching system of the second aspect, wherein the route-searching system comprises node retrieval means and node extraction means, the node retrieval means retrieving the closest node and retrieving a nearby node, which is in a position relatively near to the point set by the point setting means; the node extraction means compares the time zone of the nearby node retrieved by the node retrieval means and the time zone of the point determined by the time zone determination means, and extracts the nearby node that belongs to the same time zone as the time zone of the point determined by the time zone determination means; and the route-searching means carries out a route search using the nearby node extracted by the node extraction means as the starting point or end point of a route interval search that makes use of the transportation network.

In accordance with this configuration, the route-searching server retrieves the node of the nearest station in the vicinity of a point that has been set, acquires the time zone of the retrieved node of the nearest station in the vicinity, extracts the nearby node that belongs to the same time zone as the time zone of the closest node, and uses the node as the starting point or end point for a search of the route interval using the transportation network in the case that the departure point and the destination point set as the route searching conditions are not nodes, i.e., a railroad station or an airport for an airline in a transportation network. Therefore, a route can be readily searched even when a point for which the time zone is unknown has been set, and the time information of the route thus searched can be readily converted to a time that corresponds to the time zone.

The fifth aspect of the present invention is the route-searching system of the third aspect, wherein the route-searching system comprises node extraction means, wherein the node extraction means compares the time zone of the nearby node retrieved by the node retrieval means and the time zone of the point determined by the time zone determination means, and extracts a nearby node that belongs to the same time zone as the time zone of the point determined by the time zone determination means; and the route-searching means carries out a route search using the nearby node extracted by the node extraction means as the starting point or end point of a route interval search that makes use of the transportation network.

In accordance with this configuration, the route-searching server retrieves the node of the nearest station in the vicinity of a point that has been set, acquires the time zone of the retrieved node of the nearest station in the vicinity, extracts a nearby node that belongs to the same time zone as the time zone that is most numerous among the time zones of the nodes of the nearest stations, and uses the node as the starting point or end point for a search of the route interval using the transportation network in the case that the departure point and the destination point set as the route searching conditions are not nodes, i.e., a railroad station or an airport for an airline in a transportation network. Therefore, a route can be readily searched even when a point for which the time zone is unknown has been set, and the time information of the route thus searched can be readily converted to a time that corresponds to the time zone.

The sixth aspect of the present invention is the route-searching system of the first aspect, wherein the route-searching system comprises node retrieval means for retrieving a nearby node within a predetermined distance range relatively near to the point set by the point setting means; and the route-searching means carries out a route search in which all nearby nodes retrieved by the node retrieval means are used as the starting point or end point of a route interval search that makes use of the transportation network.

In accordance with this configuration, the route-searching server retrieves the node of the nearest station in the vicinity of the point that has been set, and uses the retrieved nearest station in the vicinity as the starting point or end point for a search of the route interval using the transportation network in the case that the departure point and the destination point set as the route searching conditions are not nodes, i.e., a railroad station or an airport for an airline in a transportation network. Therefore, a route can be readily searched even when a point for which the time zone is unknown has been set.

In the seventh to twelfth aspects, a route-searching server composed of the route-searching system of the first to sixth aspects can be provided. In the invention according to the thirteenth to eighteenth aspects, a route-searching method for implementing the route-searching server according to the seventh to twelfth aspects can be provided.

Figure 1:
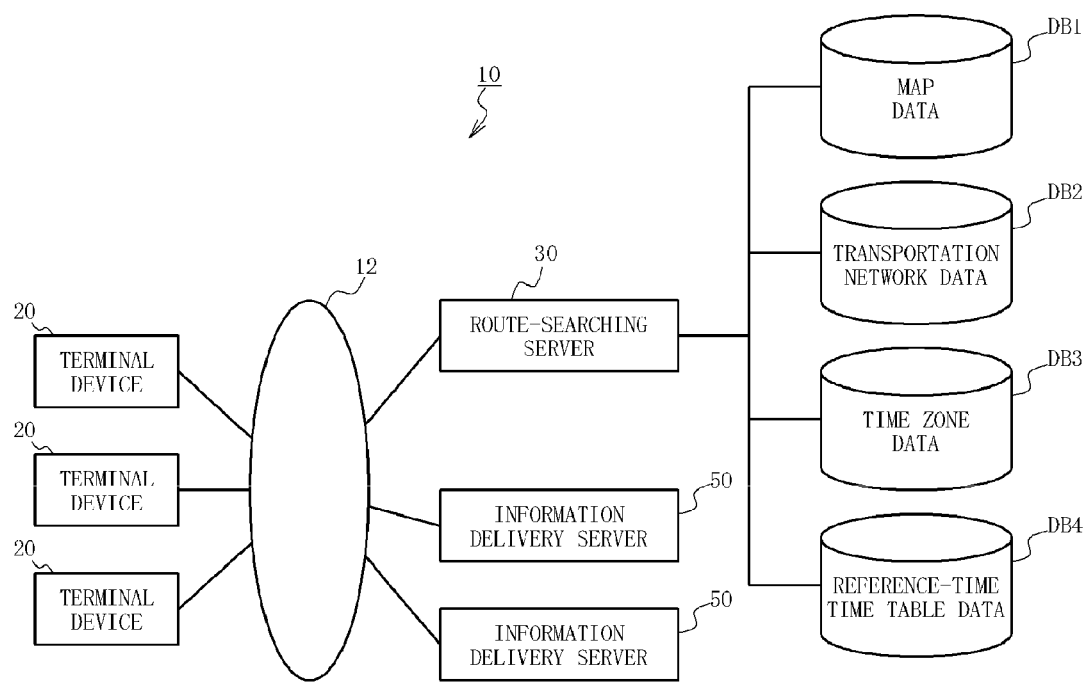
FIG. 1 is a system configuration view showing the configuration of the route information guidance system according to an example of the present invention.

KEY TO SYMBOLS 10 route-searching system
12 network
20 terminal device
21 control means
22 communication means
23 GPS receiving means
24 search request means
25 delivery data memory means
26 display means
27 operation input means
28 point setting means
30 route-searching server
31 control means
32 communication means
33 delivery data editing means
34 time zone determination means
35 node retrieval means
36 node extraction means
37 time zone comparison means
38 route-searching means
39 search request memory means
40 time conversion means
41 map data memory means
42 time zone data memory means
43 transportation network data memory means 44 reference-time time table data memory means
45 POI data memory means

BEST MODE FOR CARRYING OUT THE INVENTION

Specific examples of the present invention are described in detail below with reference to the embodiments and drawings. However, the examples described below illustrate a route-searching system for implementing the technical concepts of the present invention and are not intended to limit the present invention to this route-searching system. Application can also be equally made to a route-searching system of other embodiments included in the claims.

FIG. 1 is a system configuration view showing the configuration of the route searching system according to an example of the present invention. The route searching system 10 is configured so that the terminal device 20 using a cellular telephone or another mobile terminal, and a route-searching server 30 are connected via the Internet or another network 12, as shown in FIG. 1. The route-searching server 30 is provided with memory means (DB1) for storing map data for display, memory means (DB2) for storing transportation network data composed of nodes and links connecting the nodes for transportation lines such as railroads and aircraft, memory means (DB3) for storing time zone data associated with the time zone to which the nodes of a transportation network belong, and memory means (DB4) for storing time table data (reference time table data) that expresses the operating times of transportation systems using a reference time, e.g., GMT, without dependence on the time zone to which the nodes and links belong.

The line network, time table data, and other operating information of the transportation system can be acquired from railroad companies or other information delivery servers 50 via the network 12. Memory means in which road network data including roads and pedestrian walkways is stored is provided in the case that the route-searching system 10 carries out a route search in a route interval that uses walking or automotive transport. A total route search that includes routes using walking and transportation system from the departure point to the destination point can be carried out by providing road network data.

The route-searching server 30 searches for a route from the departure point to the destination point using transportation network data and a reference-time time table when a route searching request set with route searching conditions that include the departure point and the destination point is received from the terminal device 20. The time zone to which the departure point or the destination point belongs is determined based the time zone data and the time data of the route thus searched is converted.

The time data of the route is, e.g., the departure time of a train at the departure point, the arrival time of a train that arrives at a destination point, or the arrival time or departure time from a transfer point, and the times are converted to time data based the time zone to which the departure point or the destination point belong and are used as guidance route data. In other words, in the present invention, a route interval that uses a transportation system is searched using the reference-time time table data created based on a reference time (e.g., GMT), and the time data of the route thus searched is converted in accordance with the time zone to which the departure point or the destination point belongs to obtain a guidance route.

In accordance with the above, a new node is not required to be disposed on the boundary of the time zones to divide the link, network data is not required to be created together with the information indicating the time zones to which each link belongs, and although the data is expressed as link data that differs for each individual transportation means such as trains, aircraft, ships, and the like, there is no need to divide the links by time zone and the amount of data can be reduced.

Furthermore, in the route searching procedure, there is no need to carry out route searching while determining the time zone to which nodes and links belong each time a node or link is followed. In other words, there is no need to carry out a route search while the time difference is converted even when immediately prior nodes and links and the next nodes and links belong to different time zones, and the route search processing load is not increased.

The time zone of each node that corresponds to the time zone data is stored in memory and the time zone to which the departure point or the destination point belongs can be specified in the case that the departure point and the destination point set as the route searching conditions are nodes, i.e., a railroad station or an airport for an airline in a transportation network. If such is not the case, the route-searching server 30 extracts the nearest station to the point that has been set, or the nearest station in the vicinity, or another node; acquires the time zone of the extracted node; and determines the time zone of the departure point or the destination point. It is possible to use a number of methods as the method for extracting the node and determining the time zone. These methods shall be described further below. The start point and end point of the route interval that uses a transportation system and the time zones to which these points belong can be determined even in the case that an arbitrary point has been set as the departure point or the destination point.

Figure 2:
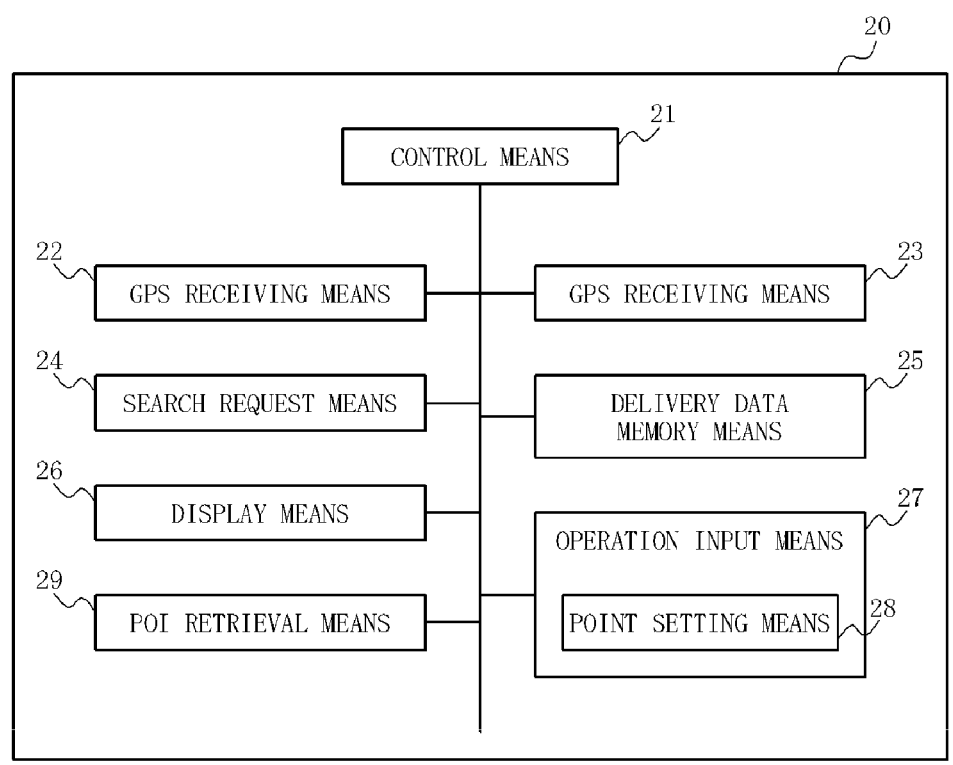
FIG. 2 is a block diagram showing a detailed configuration of the terminal device in an example of the present invention.
Figure 3:
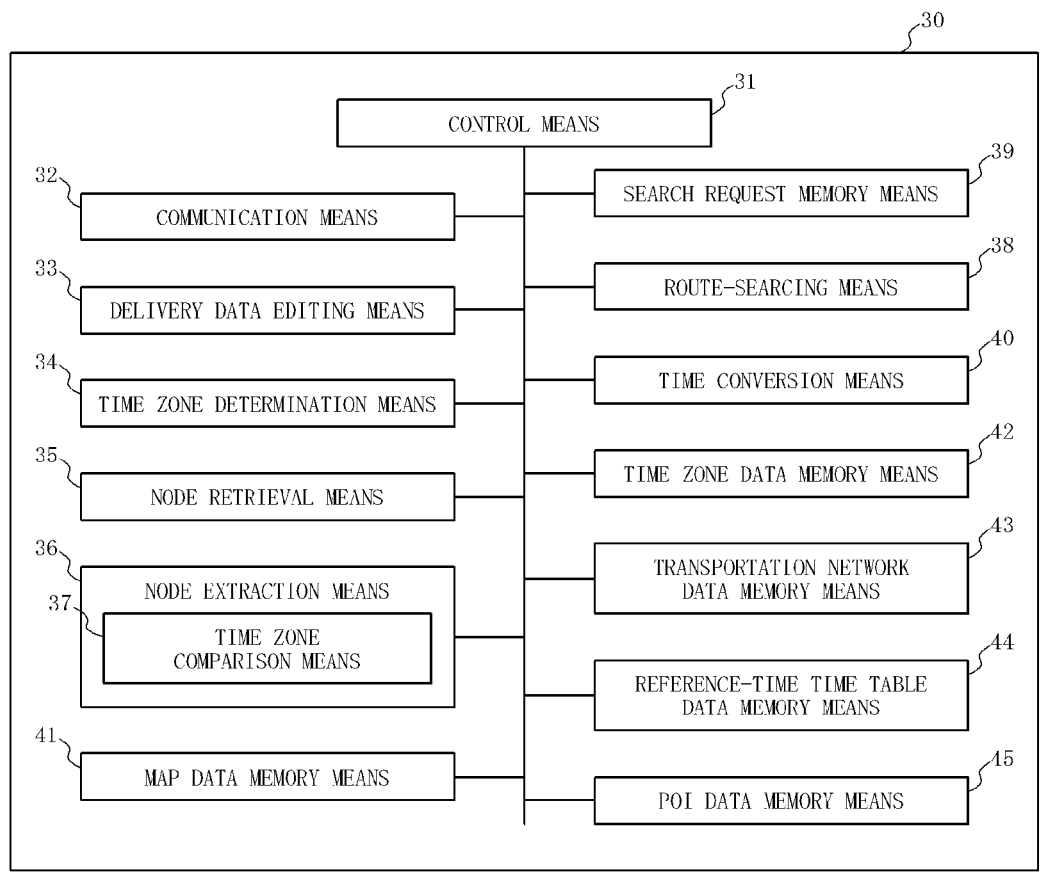
FIG. 3 is a block diagram showing a detailed configuration of the route-searching server in an example of the present invention.

FIG. 2 is a block diagram showing the configuration of the terminal device 20 constituting the route-searching system 10 shown in FIG. 1. FIG. 3 is a block diagram showing the configuration of the route-searching server 30 constituting the route-searching system 10 shown in FIG. 1.

As shown in FIG. 2, the terminal device 20 is composed of control means 21; communication means 22; GPS receiving means 23 for position detection; route searching request means 24 for making a route searching request to the route-searching server 30; delivery data memory means 25 for temporarily storing guidance route data received from the route-searching server 30; display means 26 for displaying a map and guidance route; operation input means 27 that includes point setting means 28 for setting a departure point, a destination point, or another point in the route searching conditions; POI retrieval means 29 for retrieving POI; and the like.

The control means 21 is a microprocessor having a RAM, ROM, and processor (not shown), and controls the operation of each part using a control program stored in the ROM. The communication means 22 is a communication interface for transmitting and receiving communication data to and from the route-searching server 30 or the like via a network 12.

The GPS receiving means 23 receives a signal from a GPS satellite and calculates the latitude and longitude of the present location. The display means 26 is composed of a liquid crystal display panel or the like and is used for displaying a guidance route, recommended route, or map delivered (sent) from the route-searching server 30. The display means 26 displays a menu screen and functions as input means for operating the terminal device 20. The display means 26 is provided with a touch panel and may be configured so that items displayed on the menu screen can be selected by finger touch or the like.

The operation input means 27 is composed of keys, dials, or the like and accepts input for operating the terminal device 20. The route searching request means 24 edits the route searching request to the route-searching server 30 on the basis of the departure point and destination point inputted by the operation input means 27, or on the basis of the present position information measured by the GPS receiving means 23. The point setting means 28 is means for setting the departure point and the destination point among the route searching conditions using the keys or the like of the operation input means 27, or using the menu screen displayed on the display means 26.

The delivery data memory means 25 temporarily stores map data and guidance routes transmitted from the route-searching server 30 to the terminal device 20. The guidance route data and map data stored in the delivery data memory means 25 are read out as required and displayed on the display means 26. The configuration of such a terminal device 20 is the same configuration as a common terminal device in a communication-type route-searching system.

On the other hand, as shown in FIG. 3, the route-searching server 30 is composed of control means 31, communication means 32, delivery data editing means 33, time zone determination means 34, node retrieval means 35, node extraction means 36, time zone comparison means 37, route-searching means 38, search request memory means 39, time conversion means 40, map data memory means 41, time zone data memory means 42, transportation network data memory means 43, reference-time time table data memory means 44, POI data memory means 45, and the like.

The control means 31 is a microprocessor having a RAM, ROM, and processor (not shown), and controls the operation of each part using a control program stored in the ROM. The communication means 32 is a communication interface for transmitting and receiving communication data between the terminal device 20, a information delivery server 50 for providing a variety of POI information, and the information delivery server 50 for providing time table data, line data, operating status data of transportation systems, via a network 12; and receives various requests from the terminal device 20 or delivers various information to the terminal device 20.

The map data memory means 41 stores map data for display. The transportation network data memory means 43 stores transportation network data in which railroads, aircraft, and other lines of transportation are configured as links that join nodes together. The time zone data memory means 42 stores time zone data associated with time zones to which each node of a transportation network belongs. The reference-time time table data memory means 44 stores time table (reference-time time table data) in which the operating times of transportation system are expressed using a reference time, e.g., GMT, without dependence on the time zone to which nodes and links of the transportation network data belong.

The route-searching server 30 temporarily stores route searching conditions together with the identification information of the terminal device 20 in the search request memory means 39 when a route searching request set with route searching conditions that include the departure point and the destination point is received from the terminal device 20. A route is searched from a departure point to a destination point using transportation network data and reference-time time table data. The time zone to which the departure point or the destination point belongs is determined based on the time zone data and is converted to time data of a searched route.

Examples of the time data of a route include the departure time of a train from a departure point, the arrival of a train arriving at a destination point, and the arrival or departure time at a transfer point; and such times are converted to time data based on the time zone to which the departure point or the destination point belongs and the converted time is used as guidance route data. In other words, in the present invention, a route interval using a transportation system is searched using reference-time time table data created on the basis of a reference time (e.g., GMT), and the time data of the route thus searched is converted in accordance with the time zone to which the departure point or the destination point belongs and the converted time is used in the guidance route. The user of the terminal device 20 can thereby obtain time information that corresponds to the time zone to which the departure point or the destination point belongs as time information of the guidance route thus searched.

In the case that the departure point and destination point in the route searching conditions designated using the terminal device 20 are nodes in the transportation network data, i.e., stations, airports, or the like, it is possible to search for an optimal route or a designated number of candidate routes from the departure point to the destination point using a time table that conforms to a reference time by using the reference-time time table data stored in the reference-time time table data memory means 44 and the transportation network data stored in the transportation network data memory means 43.

The time zone determination means 34 refers to the time zone data stored in the time zone data memory means 42, i.e., the data stored in association with the nodes of the time zones to which each node of the transportation network belongs, and determines (specifies) the time zone to which the departure point or the destination point belongs in regard to the departure point or the destination point set in the route searching conditions. The route-searching server 30 uses the time conversion means 40 to convert the time information of the route (the route based on the reference-time time table data) searched by the route-searching means 38, on the basis of the time zone to which the departure point or the destination point belongs as determined by the time zone determination means 34, and transmits the result to the terminal device 20.

In accordance with such a configuration, the route search is carried out using a uniform time table data created using GMT as the reference time, and the time information of the route obtained as a result of the search can be provided to the terminal device 20 using present location time obtained by specifying the time zone to which the departure point or the destination point belong and converting the time from the reference time. In the case that the departure time from the departure point, the arrival time at the destination point, and other time conditions are set in the route searching conditions, the time conversion means 40 naturally carries out a route search on the basis of the time zone determined by the time zone determination means 34 and after having made a time conversion with the time conditions thus set based on the reference time.

Figure 4:
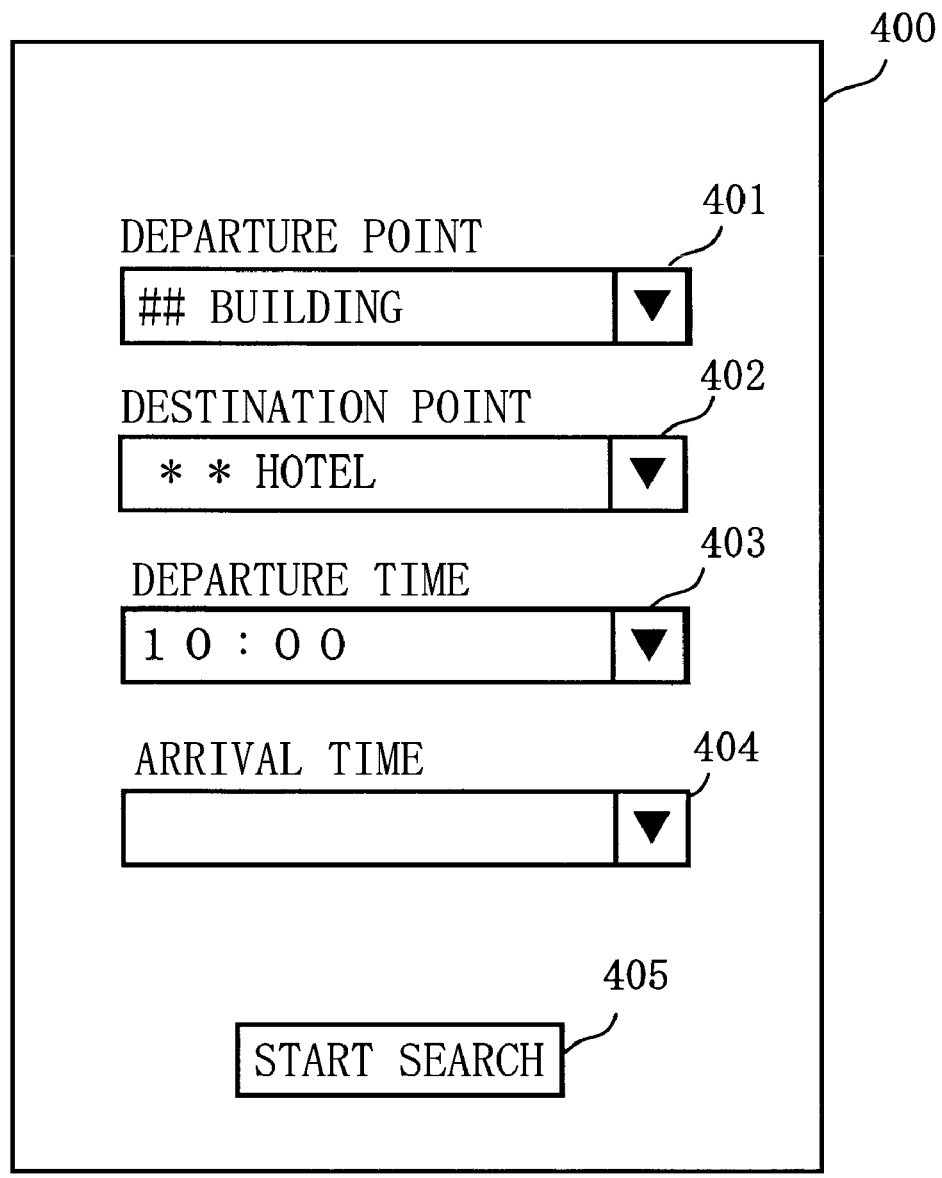
FIG. 4 is a diagram showing an example of the conditions setting screen displayed when the route searching conditions are to be set in the terminal device.

FIG. 4 is a diagram showing an example of a conditions setting screen 400 displayed on the display means 26 when the route searching conditions are to be set in the terminal device 20. Displayed on the conditions setting screen 400 shown in FIG. 4 are a departure point input field 401, a destination point input field 402, a departure time input field 403, an arrival time input field 404, and a search start button 405.

The departure point and the destination point are set by inputting the address or telephone number; the station name, building name or other point name; or the latitude and longitude or the like into the departure point input field 401 and destination point input field 402. In other words, the input fields essentially accept free word input, and it is possible to set an address, telephone number, POI (point of interest) name, or the like.

It is also possible to operate a pull down button to call up and set a registered point or a route search history previously registered in the terminal device 20. The departure time for departure from a departure point is inputted into the departure time input field 403. It is also possible to include the departure date in the departure time when the departure time is inputted. The arrival time at the destination point is inputted into the arrival time input field 404. The arrival data may similarly be included in the arrival time and inputted.

Setting can be omitted in the case that time conditions will not be set. The example shown in FIG. 4 has "## Building" set as the departure point, " Hotel" set as the destination point, and the departure time "10:00" from the departure point set as a time condition. The route searching request is transmitted from the terminal device 20 to the route-searching server 30 when the required conditions have been set and the search start button 405** is operated.

In the case that the departure point and the destination point of the route searching conditions set in the terminal device 20 are points that are not nodes in the transportation network, the time zone to which the departure point and the destination point belong cannot been specified even with reference to the time zone data.

In such a case, the nodes of the transportation network positioned in the vicinity of the set points are retrieved using the first or second procedure described below, a specific node or plurality of nodes are extracted from among the retrieved nodes using predetermined conditions, and the time zone of the node is specified.

In the first procedure, the node retrieval means 35 retrieves the node (closest node) of a transportation network having the closest distance from the point set by the point setting means 28 (see FIG. 2) in the terminal device 20, and the time zone determination means 34 acquires the time zone of the closest node retrieved by the node retrieval means 35 and specifies the time zone as the time zone of the set point. Accordingly, the time zone determination means 34 includes a closest-node time zone acquisition means (not shown) for referring to the time zone data memory means 42 and acquiring the time zone to which the closest node belongs.

In the second procedure, the node retrieval means 35 retrieves the node (hereinbelow referred to as the nearby node) of a transportation network positioned nearby (e.g., within a fixed distance range) the point set by the point setting means 28 (see FIG. 2) in the terminal device 20. The time zone determination means 34 acquires the time zones to which the retrieved nearby nodes belong and determines the time zone that is most numerous as the time zone of the set point. Accordingly, the time zone determination means 34 includes a nearby-node time zone acquisition means (not shown) for referring to the time zone data memory means 42 and acquiring the time zones to which the nearby nodes belong.

In the case that a point which is not a node of the transportation network has been set as the departure point or the destination point as a route searching condition set in the terminal device 20, the node extraction means extracts, according to the first procedure or second procedure described below, and using the time zone of the closest node determined by the first or second procedure or the time zone that is most numerous among the time zones to which the nearby nodes belong, the starting point and the end point of a route search that uses a transportation system, i.e., the nodes of the departure point and the destination point for a route search carried out by the route-searching means 38 using the transportation network data.

In the first procedure, the node retrieval means 35 retrieves the closest node and a plurality of nearby nodes; among the retrieved nearby nodes, extracts only the nearby nodes belonging to the time zone that matches the time zone (see determination of the time zone using the first procedure described above) of the closest node determined by the time zone determination means 34; and uses the nearby nodes thus extracted as the starting point and end point when a search is made of a route interval that uses the transportation network as searched by the route-searching means 38. For this reason, the node extraction means 36 includes time zone comparison means 37 for comparing the time zone of the closest node determined by the time zone determination means 34 and the time zone of the nearby nodes retrieved by the node retrieval means 35.

In the second procedure, the node retrieval means 35 retrieves a plurality of nearby nodes; extracts from the retrieved nearby nodes only those nearby nodes belonging to the time zone that matches the time zone (see determination of the time zone using the second procedure described above) of the nodes that belong to the time zone with the greatest number of nearby nodes as determined by the time zone determination means 34; and uses the nearby nodes thus extracted as the starting point and end point of when a route interval that uses the transportation network is searched by the route-searching means 38. For this reason, the node extraction means 36 includes time zone comparison means 37 for comparing the time zone of the nearby nodes that belong to the time zone with the greatest number of nearby nodes as determined by the time zone determination means 34, and the time zone of the nearby nodes retrieved by the node retrieval means 35.

Provided that there are extracted a plurality of nearby nodes as a starting point and end point when a search is made of a route interval that uses a transportation network, the route-searching means 38 can retrieve a plurality of candidate routes by using as a departure point (nearest station to the departure point) each of the nearby nodes that belong to the same time zone in the vicinity of the departure point set as a point, and by using as a destination point (nearest station to the destination point) each of the nearby nodes that belong to the same time zone in the vicinity of the destination point set as a point. Therefore, the total route search that includes a walking route interval between the set point and the nearest node of the transportation network can be carried out using reference-time time table data.

In the case that a point which is not a node of the transportation network has been set as the departure point or the destination point as a route searching condition set in the terminal device 20, it is possible use the same method as an ordinary route-searching server using road network data (not shown) to search for a route between the departure point which has been set and the extracted nearby nodes (nearest stations to the departure point) of the departure point, and a route (e.g., walking route) between the destination point which has been set and the extracted nearby nodes (nearest stations to the destination point) of the destination point as described above. In this manner, the route-searching server 30 can search for a plurality of candidate routes for moving from a departure point to a destination point by walking or by using a transportation system, and provide the candidate routes to the terminal device 20.

Although storage capacity is increased, if the route-searching server 30 is provided with ordinary time table data (the time information of the time zone in the case that the transportation network belongs to the same time zone), it is possible to search for a route with local time that is based on the time zone to which the departure point and destination point belong in the same manner as an ordinary route-searching server in the case that the departure point and the destination point belong to the same time zone.

Figure 5:
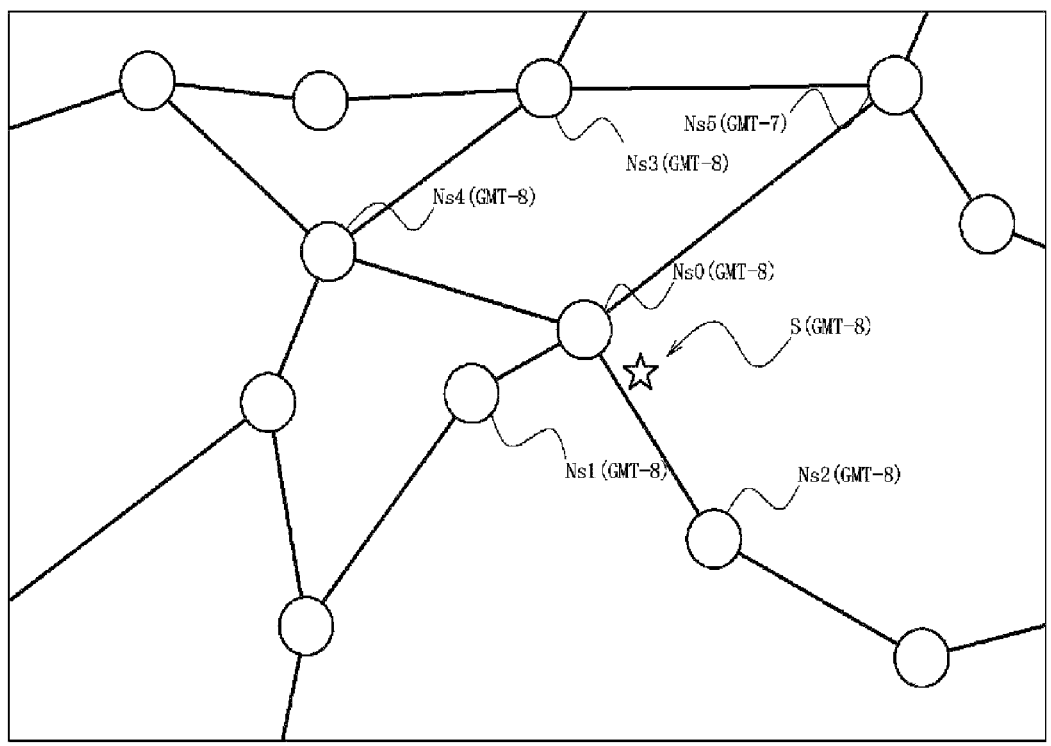
FIG. 5 is a schematic view for illustrating the procedural concept for extracting nodes near the departure point.
Figure 6:
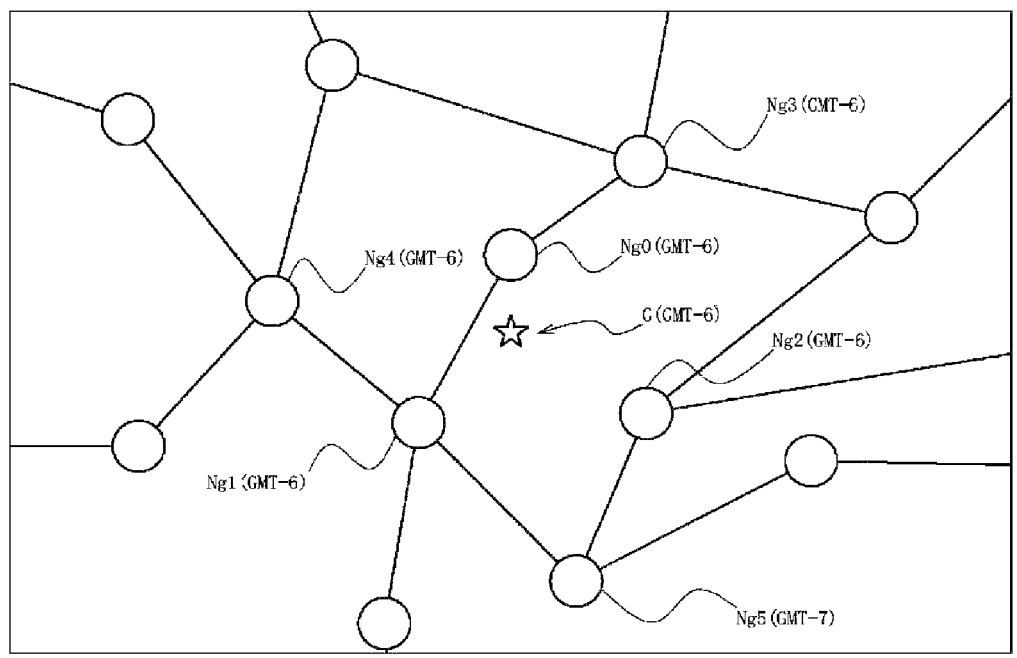
FIG. 6 is a schematic view for illustrating the procedural concept for extracting nodes near the destination point.

FIGS. 5 and 6 are schematic views for illustrating the concept of extracting nodes in the vicinity of the points, i.e., the nodes of the transportation network, in the case that the departure point S and the destination point G set in the terminal device 20 are not nodes in the transportation network. FIG. 5 shows the concept of extracting nearby nodes in the vicinity of the departure point S, and FIG. 6 shows the concept extracting nearby nodes in the vicinity of the destination point G.

In FIGS. 5 and 6, the solid lines show the lines of the transportation system, i.e., the transportation network, wherein the stations and airports of the transportation system are used as nodes (reference numerals Ns0 to Ns5, or the like; and Ng0 to Ng5, or the like), and the connections between nodes are expressed as links (intervals). The reference symbol S indicates a departure point set in the terminal device 20, and the reference symbol G indicates a destination point set in the terminal device 20.

Time zone data which shows which time zone the node position belongs is set in relation to GMT and is stored in association with each node on the basis of the latitude and longitude of the node. In FIGS. 5 and 6, the time zone data to which the nodes belong are assigned as GMT−7 and GMT−8 for each node. The time zone data may be assigned and stored in the node data of the transportation network data in the manner of FIGS. 5 and 6, or may be stored in a time zone table format in memory means (the time zone data memory means 42) that is separate from the transportation network data memory means 43.

In FIG. 5, since the departure point S which has been set is not a node in the transportation network, the node retrieval means 35 retrieves the node Ns0 (referred to as the closest node) in the closest position from the point S in terms of rectilinear distance, or retrieves a plurality of nearby nodes in positions relatively near to the point S (within a predetermined distance range). In FIG. 5, the nodes Ns0 to Ns5 are retrieved as nearby nodes.

When a node is retrieved, the time zone determination means 34 determines the time zone of the retrieved node. In the case that the closest node Ns0 is retrieved, the time zone to which the closest node Ns0 belongs, time zone GMT−8 in this case, is obtained and determined to be the time zone of the departure point which has been set. In the case that a plurality of nearby nodes Ns0 to Ns5 have been retrieved, the time zones to which the nearby nodes belong are examined, and the time zone that is most numerous is determined to be the time zone of the departure point. In the example of FIG. 5, the time zone GMT−8 is most numerous and is used as the time zone of the departure point S.

Next, in order to select a node that will serve as the starting point for searching for a route interval that uses a transportation system, the node extraction means 36 compares the time zone of the nearby nodes Ns0 to Ns5 retrieved by the node retrieval means 35 and the time zone of the departure point S determined by the time zone determination means 34, and extracts the nearby nodes that belong to the same time zone as the time zone of the departure point S. In this example, the time zone of the departure point S is determined to be GMT−8 and the nearby nodes Ns0 to Ns4 that belong to the same time zone as the departure point are therefore extracted as the nodes of the starting point for a search. The time zone to which the node Ns5 belongs is GMT−7 and is therefore not extracted as a node of the starting point for a search.

The determination of the time zone of the destination point G shown in FIG. 6 and the procedure for extracting the nearby nodes are the same as the procedure illustrated in FIG. 5. In the example of FIG. 6, the time zone of the destination point G determined by the time zone determination means 34 is GMT−6, and the nodes extracted by the node extraction means 36 are nodes Ng0 to Ng4 and belong to the time zone GMT−6. The node Ng5 belongs to the time zone GMT−7 and is therefore not extracted. In the examples shown in FIGS. 5 and 6, the time zones to which the departure point S and destination point G belong are GMT−8 and GMT−6, respectively, and the a route search is carried out between points in different time zones. Such examples are ordinarily oft-occurring cases in a search of a route interval that uses aircraft or a long-distance route interval such as crossing a continent.

In this manner, when the starting point nodes (departure point S side) and the end point nodes (destination point G side) for searching for a route interval that uses a transportation system are to be extracted, the route-searching means 38 uses reference-time time table data and transportation network data for a combination of starting point nodes and end point nodes obtained therefrom, searches for a route between two nodes, and searches for a plurality of candidate routes. The time information of the routes thus searched is naturally expressed in reference time, and the time conversion means 40 therefore converts the time information of the routes to the local time of any of the time zones on the basis of the time zone to which the departure point S or destination point G belongs, and provides the converted time information to the terminal device 20.

As long as the route-searching server 30 has ordinary road network data, an optimal route between the departure point S or the destination point G and the nearby nodes (the starting point nodes or the end point nodes of the route interval that uses a transportation network) extracted by the node extraction means 36 can be searched using the road network data. Therefore, it is possible to search for a walking route between the departure point S and nearby nodes, and the destination point G and nearby nodes, and a total route search can be carried out between two points, i.e., the departure point S and the destination point G.

Figure 7:
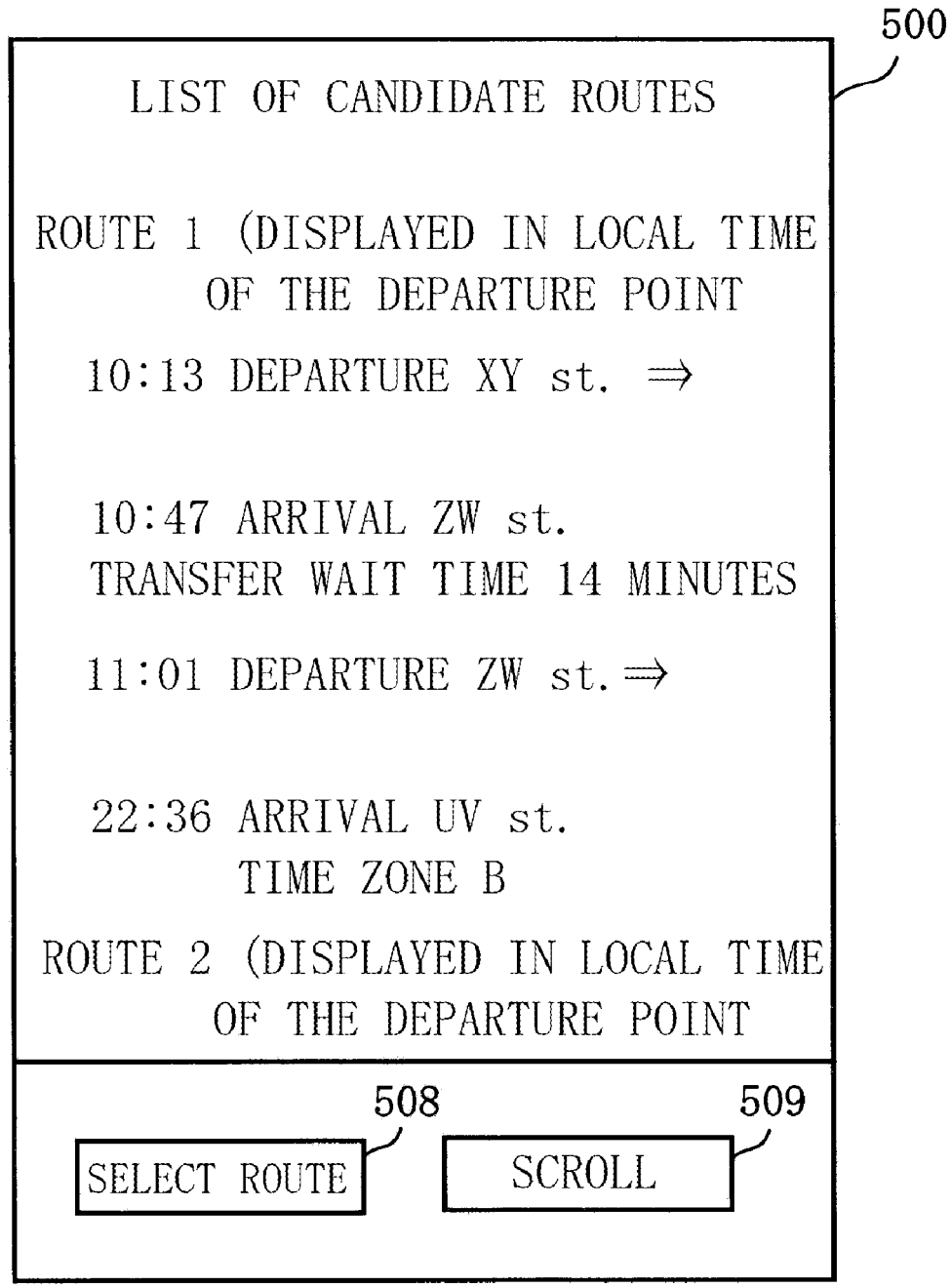
FIG. 7 is a diagram showing an example of the route guidance screen for displaying the route search results in the terminal device.

FIG. 7 is a diagram showing an example of a route guidance screen for displaying the route search results in the terminal device 20. A list of candidate routes from route 1 to route N is displayed on the route guidance screen 500. The candidate routes are routes that make use of transportation systems (transportation networks) for moving between nodes extracted as the starting point of a route search. Route 1 departs XY station (XY st) at 10:13, arrives at ZW station (ZW st) at 10:47, has a transfer wait time of 14 minutes, departs ZW (ZW st) at 11:01, and arrives at UV station (UV st) at 22:36. The time information of the route is displayed in the local time of the departure point (time based on the time zone to which the departure point belongs).

The example of FIG. 7 shows the case in which the nodes of the transportation network are set as the departure and destination points. In the case that a point that is not a node of the transportation network is set as the departure point or the destination point and a walking route interval is included, it is needless to say that the route interval from the set point to the nearest node of the transportation network is also displayed.

A scroll button 509 is displayed on the route guidance screen 500, and the screen can be scrolled to refer to the information of the candidate routes from route 2 and thereafter. When the number of the displayed candidate route is clicked to select a desired route, the image of the map and route is displayed and the route guidance can be received. A route display that includes the route interval is displayed in the case that a route interval (e.g., a walking route interval) that uses the road network can be searched from a departure point to a starting point of a route interval that uses a transportation system (XY station in route 1).

In FIG. 7, the time information of the entire route is displayed in the local time for the departure point (the time based on the time zone determined for the departure point), but no limitation is imposed thereby. For example, the route may be displayed in the local time of the departure point to just prior to the destination point (the time based on the time zone determined for the departure point); the time information of the destination point may be displayed in time based on the time zone determined for the destination point; or the time information of the entire route may be displayed in time based on the time zone determined for the destination point. It is also possible to convert the time of each node of the route on the basis of the time zone to which the nodes belong and to display each node in the local time.

Figure 8:
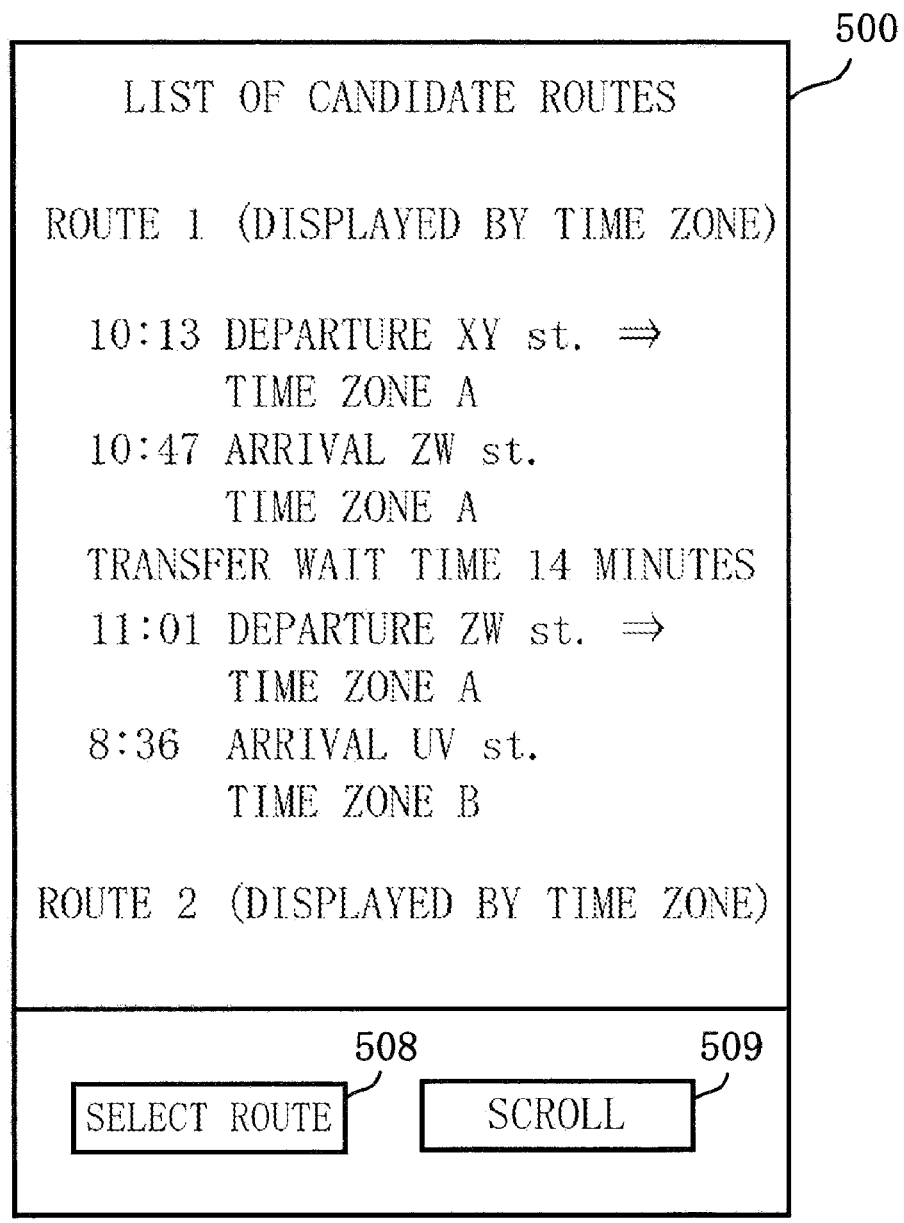
FIG. 8 is a diagram showing another example of the route guidance screen for displaying the route search results in the terminal device.

In this case, the time zone to which each node belongs is displayed at the same time. FIG. 8 is a diagram showing an example of the route guidance screen for the case in which the results of a route search are displayed on the terminal device 20 in such a manner. A list of candidate routes from route 1 to route N is displayed on the route guidance screen 500. The candidate routes are routes that make use of transportation systems (transportation networks) for moving between nodes extracted as the starting point of a route search. Route 1 departs XY station (XY st) belonging to time zone A at 10:13, arrives at ZW station (ZW st) belonging to time zone A at 10:47, has a transfer wait time of 14 minutes, departs ZW (ZW st) at 11:01, and arrives at UV station (UV st) belonging to time zone B at 8:36. The time is displayed in local time based on the time zone to which each node belongs. In the case that a point that is not a node of the transportation network is set as the departure point or the destination point and a walking route interval is included, the route interval from the set point to the nearest node of the transportation network is also displayed.

Figure 9:
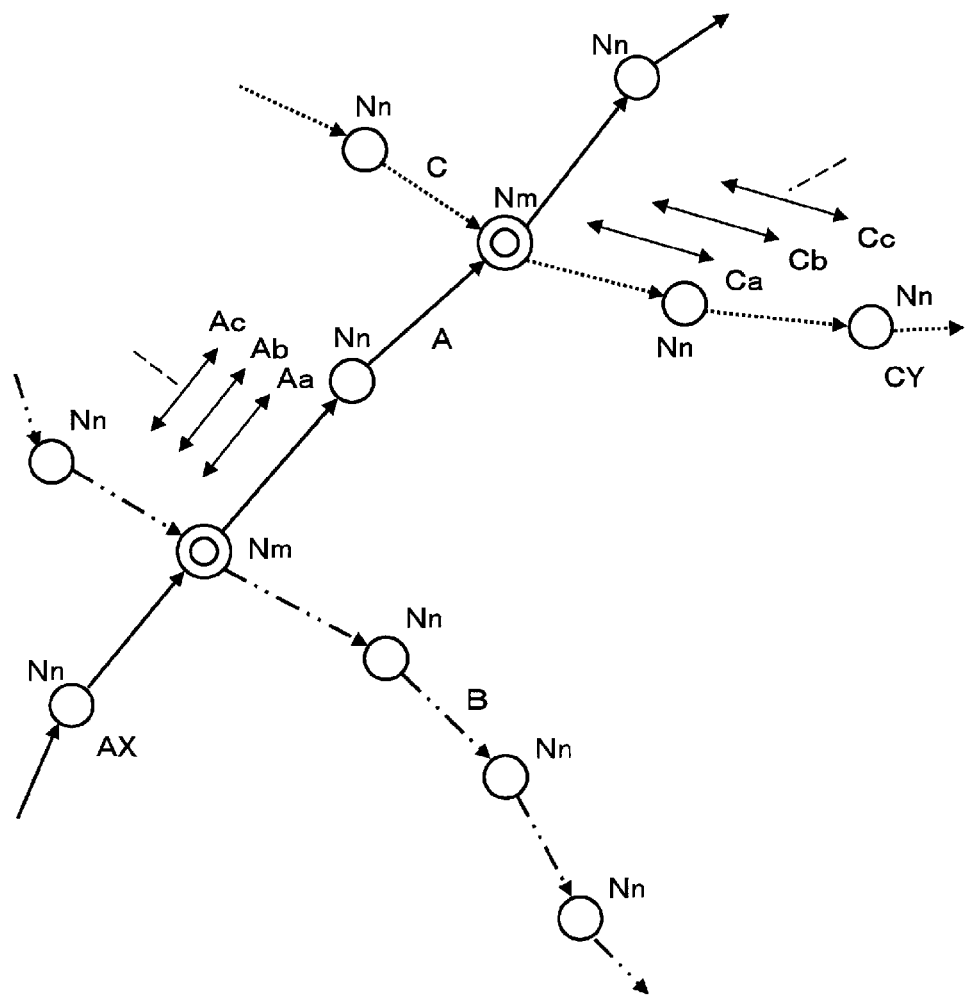
FIG. 9 is a schematic view showing the concept of route searching using transportation network data.

FIG. 9 is a view showing the concept of route searching using transportation network data. In the case that the transportation network data for searching for a route using a transportation system is composed of, e.g., transportation lines A, B, C, as shown in FIG. 9, the stations (airports in aircraft lines) located on the transportation lines A, B, C are used as nodes, the intervals connecting the nodes are represented by directional links, and the node data (latitude and longitude) and link data (link number) are used as network data. In FIG. 9, Nn (○) and Nm (◉) indicate nodes, and Nm (◉) indicates a transit change point (transfer station or the like) of the transportation line. The links having directionality connected between the nodes are indicated by arrows (solid, dotted, and chain-dotted). The links include links that face in the upward and downward directions of the road, but in FIG. 9, only links oriented in the direction of the arrows are shown in order to simplify the diagram.

In the transportation network, there is a plurality of trains and aircraft (the routes of individual trains, aircraft, and the like are referred to as transportation means) operating on the transportation lines shown in FIG. 9. The departure time from a node in each transportation means and the arrival time at the next node are fixed (stipulated by the time table data), and the link costs are the required time from the node (station) at one end of a link and the node (station) at the other end of the link as defined by the time table.

In the transportation network, there are cases in which each link does not necessarily link to an adjacent node. Such an example is the case of an express train and a local train. In such a case, a different plurality of links is present on the same transportation line, and there are also cases in which the link costs between the nodes differ depending on the transportation means.

In the transportation network illustrated in FIG. 9, there are a plurality of transportation means (routes) Aa to Ac . . . on the same links of the transportation means A, and a plurality of transportation means (routes) Ca to Cc . . . on the transportation line C. Therefore, the operation network of the transportation system is different from a simple road network, and the data of the nodes, links, and link costs is a data amount that is proportional to the total number of transportation means (the routes of individual aircraft, trains, and the like)

All of the transportation means that can be used (boarded) must be searched, the transportation means that matches the search conditions must be specified, and time information of each train and the link costs must be determined from the departure node (starting point node) to the destination node (end point node) using time table data in order to search for a route from a departure node (starting point node) to a destination node (end point node) using the data (transportation network data) of the physical nodes and links shown in FIG. 9.

For example, in FIG. 9, in the case that a route search is carried out in which a specific departure time is designated with the departure point being the node AX on the transportation line A, and the node CY on the transportation line C being the destination point, all of the transportation means from the departure time and thereafter are sequentially selected as routes of the departure time from among the transportation means Aa to Ac . . . that operate on the transportation line A. All combinations of transportation means that can be boarded in terms of time at the transit change node are searched from among the transportation means Ca to Cc . . . operating on the transportation line C on the basis of the arrival time at the transfer node to the transportation line C, and the required time of each route and number of transfers are totaled and guidance is provided.

In contrast, the road network data for searching for a route interval that uses walking or automobile is different from transportation network data, and is composed of a physical structure network of roads (starting points, end points, intersections, and curve points are nodes, and the intervals between adjacent nodes are links). The link cost data represents the distance of the link or the required time in the case that movement takes place at a standard movement speed. The route search follows all the nodes and links that arrive from the node of the departure point at the node of the destination point, and the route with the smallest total cost of the links is searched.

Figure 10:
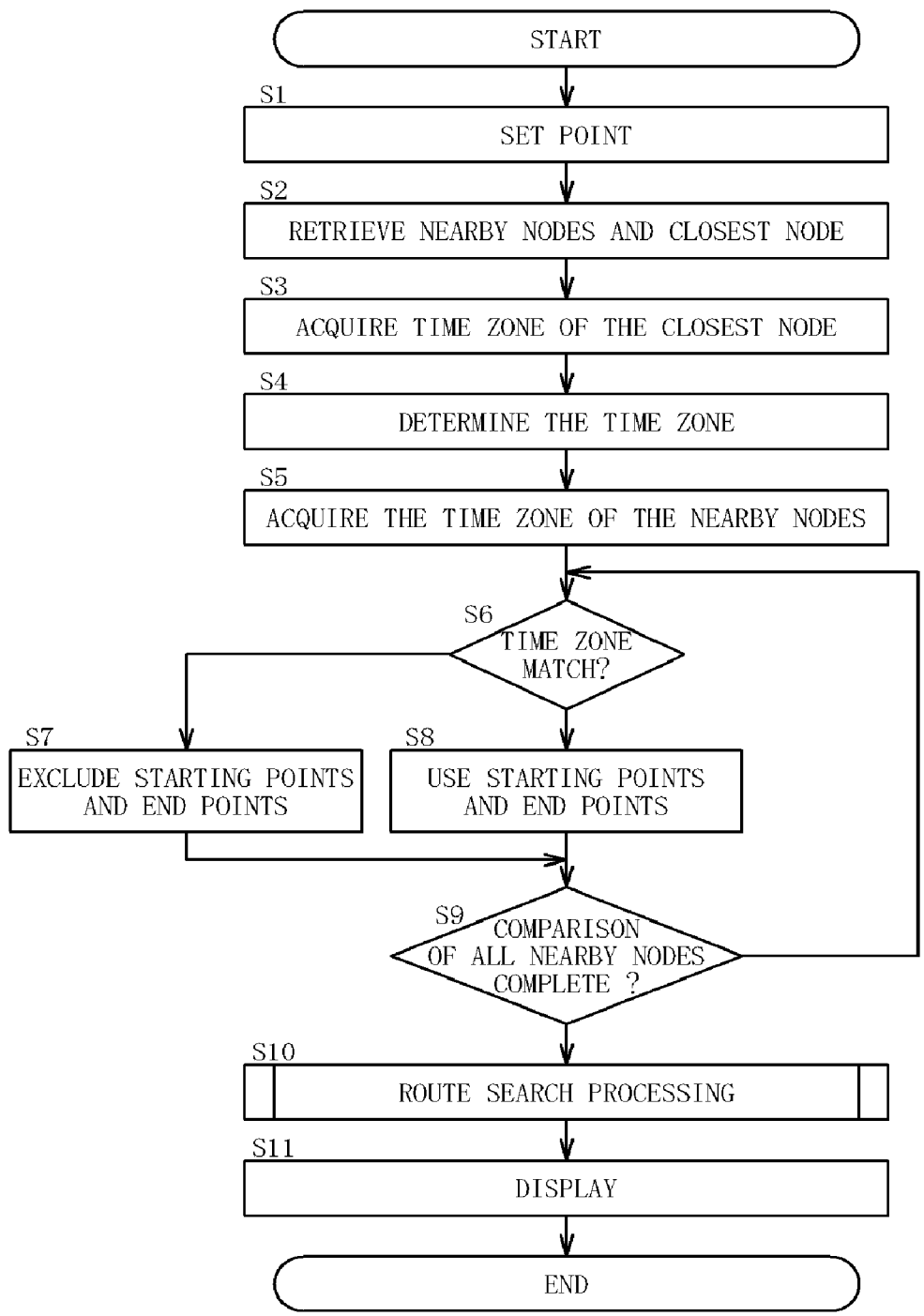
FIG. 10 is a flowchart showing route searching procedures.
Figure 11:
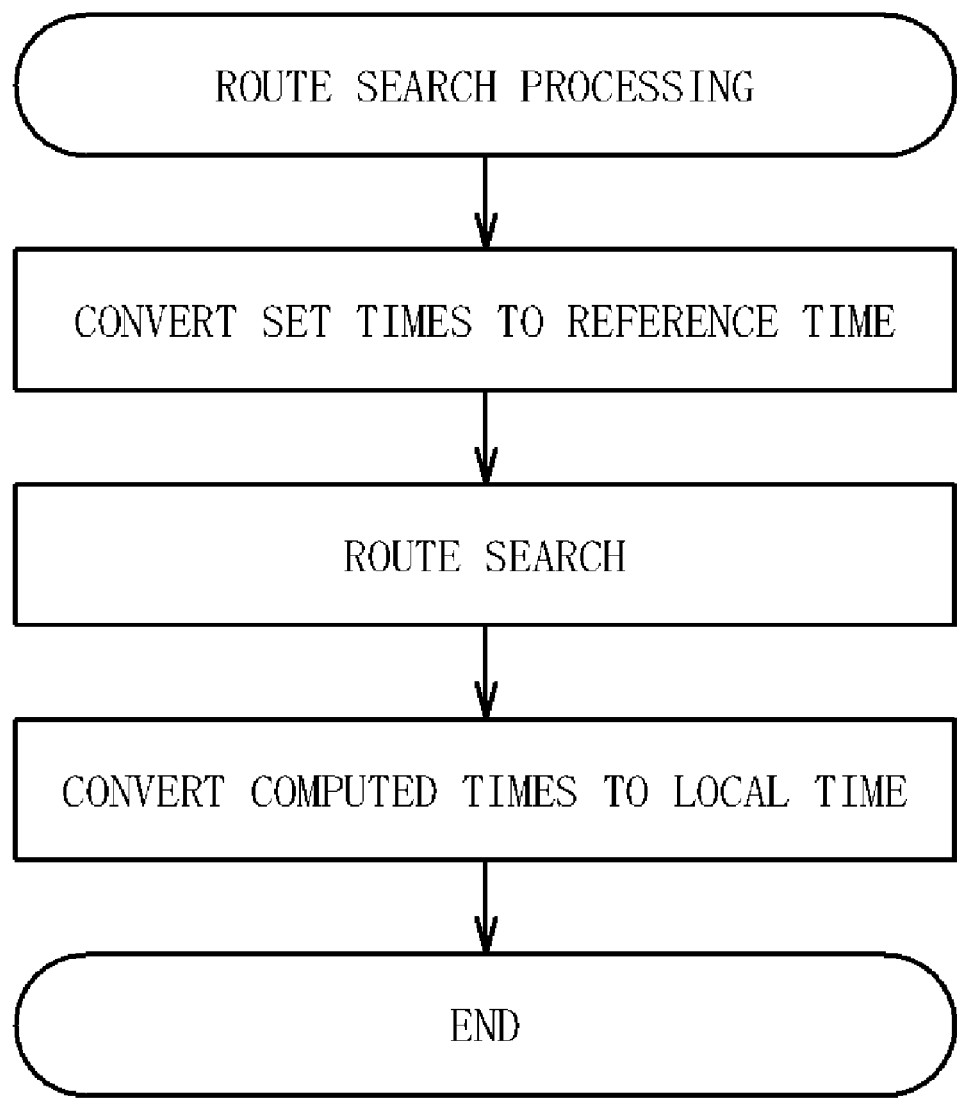
FIG. 11 is a flowchart showing route searching procedures in the case that the departure time, the arrival time, and other time conditions have been set as route searching conditions.

Described next is the operating procedure in the route-searching system of the examples of the present invention described above. FIG. 10 is a flowchart showing the route search procedure in the route-searching server 30; and FIG. 11 is a flowchart showing the route search procedure in the case that the departure time, the arrival time, and other time conditions have been set as route searching conditions.

When the departure point and destination point have been set (step S1) by the point setting means 28 (see FIG. 2) of the terminal device 20, the setting data is edited into a route searching request and sent to the route-searching server 30.

The node retrieval means 35 (see FIG. 3) retrieves a predetermined number (e.g., five) nodes (hereinafter referred to as nearby nodes) on the transportation network of public transportation systems in the sequence of short distances from the departure point and destination point thus set on the basis of the route searching conditions thus set; and retrieves the node (hereinafter referred to as closest node) positioned nearest in distance to the departure point and the destination point (step S2).

When the closest node has been retrieved, the time zone determination means 34 refers to the time zone data stored in the time zone data memory means 42, acquires the time zone of the closest node (step S3), and determines (step S4) the acquired time zone to be the time zone of the departure point or destination point set as the route searching conditions.

The time zone comparison means 37 of the node extraction means 36 refers to the time zone data stored in the time zone data memory means 42, acquires (step S5) the time zone of the nearby nodes retrieved by the node retrieval means 35, and compares (step S6) the time zone thus acquired and the time zone determined by the time zone determination means 34, i.e., time zone of the closest node.

Next, the node extraction means 36 excludes (step S7) the nearby nodes from the starting points or end points of the route search in the case that the time zone of the nearby nodes and the time zone of the closest node are different (No in step S6), and extracts (step S8) the nearby nodes as starting points or end points of the route search in the case that the time zone of the nearby nodes and the time zone of the closest node are the same (Yes in step S6). The comparison processing of step S6 is repeated (step S9) until all of the nearby nodes have been completed.

When the nearby nodes that serve as base points of the route search have been extracted in this manner, a route search is carried out (step S10) by the route-searching means 38 using the nearby nodes. The search results are sent from the route-searching server 30 to the terminal device 20 and displayed (step S11) on the display means 26 of the terminal device 20.

There follows a detailed description of the route search processing (step S10) in the case that the departure time or the arrival time have been set. FIG. 11 is a flowchart showing detailed procedure of a route search in the case that the departure time, the arrival time, and other time conditions have been set as route searching conditions. For example, in the case that the departure time has been set, the departure time is converted to reference time by the time conversion means 40 (step S101) using the information of the time zone (the time zone of the departure point) determined by the time zone determination means 34 in step S4 of FIG. 10.

Next, the route-searching means 38 carries out a route search (step S102) using the departure time converted to reference time in the processing of step S101, and using the transportation network data and the time table data (reference-time time table data) of the reference time stored in the reference-time time table data memory means 44.

The arrival time at the destination point obtained in this manner is reference time and is therefore converted (step S103) to local time using the time zone information of the destination point.

In the present example, the nearby nodes are a predetermined number of nodes in sequence near in terms of distance from the departure point or the destination point, but the method for determining the nearby nodes is not limited to the above. For example, the nodes of the public transportation system within a predetermined distance (e.g., 2 km) from the departure point or the destination point may be retrieved and used as the nearby nodes. In this case, the predetermined distance is reset to a suitable distance until a nearby node is retrieved in the case that nearby nodes are not retrieved with the predetermined distance noted above.

Also, an example was described above in which points other than nodes are set as the departure point or the destination point, but it shall be apparent that application can also be made to the case in which the nodes (points of stations or the like) of a transportation network are set as the departure point or the destination point.

In the present example, in the case that a point other than a node is set as the departure point or the destination point, the time zone of the point is determined and a route search is carried out by excluding the nearby nodes belonging to time zones that are different from the determined time zone, but the present invention is not limited thereby. For example, for all of the retrieved nearby nodes, it is also possible to convert the time to reference time using time zone data, carry out a route search, and to convert to local time using the time zone information added to the nearby nodes for each searched route.

In the examples above, the time zone to which the closest node belongs is used when the time zone of the set point is determined in the processing of step S4, but it is also possible instead to use the time zone that is most numerous among the time zones to which the nearby nodes belong.

As described in detail above, in accordance with the route-searching system of the present invention, a route search can be carried out using time table data expressed in a predetermined reference time without modifying the existing transportation network data even when the time zones of the departure point and the destination point are mutually different, because time zone data is added to the nodes constituting the transportation network data.

Also, route search processing can be reduced when a route search is carried out because it is not necessary to determine whether the time zones of links or nodes are the same or different. Furthermore, the time zone can be readily determined because the time zone of the node nearest to the set point is determined to be the time zone of the set point.

The invention claimed is:

1. A route-searching system having route-searching network data memory means for storing transportation network data made of nodes and links connecting the nodes, point setting means for setting a departure point and a destination point, and route-searching means for searching for a route from the departure point to the destination point using the transportation network data, the route-searching system characterized in that the route-searching system comprises time zone data memory means for storing time zone information which is associated with the nodes constituting the transportation network and to which the nodes belong; reference-time time table data memory means for storing reference-time time table data which is time table data of a transportation system, and which is created using a predetermined reference time irrespective of the time zone to which the node belongs; time zone determination means for determining the time zone to which the departure point or the destination point belongs; and time conversion means, wherein the route-searching means searches for a route from the departure point to the destination point on the basis of the transportation network data and the reference-time time table data; and the time conversion means converts the time data of the searched route into guidance route data on the basis of the time zone to which the departure point or the destination point belongs.

2. The route-searching system according to claim 1, characterized in that the route-searching system comprises node retrieval means for retrieving the closest node, which is nearest in distance from a point set by the point setting means; the time zone determination means is configured so as to include closest node time zone acquisition means for referencing time zone data stored in the time zone data memory means and acquiring the time zone of the closest node retrieved by the node retrieval means; and, in a case that a point other than the node has been set as the departure point or the destination point, the point setting means determines the time zone of the closest node acquired by the closest node time zone acquisition means to be the time zone of the point thus set.

3. The route-searching system according to claim 1, characterized in that the route-searching system comprises node retrieval means for retrieving a nearby node, which is in a position relatively near to the point set by the point setting means; the time zone determination means is configured so as to include nearby-node time zone acquisition means for referencing time zone data stored in the time zone data memory means and acquiring the time zone of a nearby node retrieved by the node retrieval means; and, in a case that a point other than the node has been set as the departure point or the destination point, the point setting means determines the time zone that is most numerous among the time zones of the nearby nodes acquired by the nearby-node time zone acquisition means to be the time zone of the point thus set.

4. The route-searching system according to claim 2, characterized in that the route-searching system comprises node retrieval means and node extraction means, the node retrieval means retrieving the closest node and retrieving a nearby node, which is in a position relatively near to the point set by the point setting means; the node extraction means compares the time zone of the nearby node retrieved by the node retrieval means and the time zone of the point determined by the time zone determination means, and extracts the nearby node that belongs to the same time zone as the time zone of the point determined by the time zone determination means; and the route-searching means carries out a route search using the nearby node extracted by the node extraction means as the starting point or end point of a route interval search that makes use of the transportation network.

5. The route-searching system according to claim 3, characterized in that the route-searching system comprises node extraction means, wherein the node extraction means compares the time zone of the nearby node retrieved by the node retrieval means and the time zone of the point determined by the time zone determination means, and extracts a nearby node that belongs to the same time zone as the time zone of the point determined by the time zone determination means; and the route-searching means carries out a route search using the nearby node extracted by the node extraction means as the starting point or end point of a route interval search that makes use of the transportation network.

6. The route-searching system according to claim 1, characterized in that the route-searching system comprises node retrieval means for retrieving a nearby node within a predetermined distance range relatively near to the point set by the point setting means; and the route-searching means carries out a route search in which all nearby nodes retrieved by the node retrieval means are used as the starting point or end point of a route interval search that makes use of the transportation network.

7. A route-searching method for a route-searching system, the route-searching method comprising the steps of:

storing transportation network data made of nodes and links connecting the nodes in a route-searching network memory means;

setting a departure point and a destination point using a point setting means;

searching for a route, using a route searching means, from the departure point to the destination point using the transportation network data;

storing time zone information which is associated with the nodes constituting the transportation network and to which the nodes belong in a time zone data memory means;

storing reference-time time table data which is time table data of a transportation system and which is created using a predetermined reference time without dependence on the time zone to which the node belongs in a reference-time table data memory means;

determining the time zone to which the departure point or the destination point belongs using a time zone determination means;

searching using the route-searching means for a route from the departure point to the destination point on the basis of the transportation network data and the reference-time time table data; and converting using a time conversion means the time data of the route thus searched into guidance route data on the basis of the time zone to which the departure point or the destination point belongs.

8. The route-searching method according to claim 7, wherein the route-searching system having node retrieval means for retrieving the closest node, which is nearest in distance from a point set by the point setting means; and the time zone determination means being configured so as to include closest node time zone acquisition means for referencing time zone data stored in the time zone data memory means and acquiring the time zone of the closest node retrieved by the node retrieval means, the route-searching method further comprising the step of:

determining using the point setting means the time zone of the closest node acquired by the closest node time zone acquisition means to be the time zone of the point thus set when a point other than the node has been set as the departure point or the destination point.

9. The route-searching method according to claim 7, wherein the route-searching system having node retrieval means for retrieving a nearby node, which is in a position relatively near to the point set by the point setting means and the time zone determination means being configured so as to include nearby-node time zone acquisition means for referencing time zone data stored in the time zone data memory means and acquiring the time zone of the nearby node retrieved by the node retrieval means, the route-searching method further comprising the step of:

determining using the point setting means the time zone that is most numerous among the time zones of the nearby nodes acquired by the nearby-node time zone acquisition means to be the time zone of the point thus set when a point other than the node has been set as the departure point or the destination point.

10. The route-searching method according to claim 8, wherein the route-searching system having node retrieval means and node extraction means, the node retrieval means retrieving the closest node and retrieving a nearby node in a position relatively near to the point set by the point setting means, the route-searching method further comprising the steps of:

comparing using the node extraction means the time zone of the nearby node retrieved by the node retrieval means and the time zone of the point determined by the time zone determination means, and extracts the nearby node that belongs to the same time zone as the time zone of the point determined by the time zone determination means; and carrying out using the route-searching means a route search using the nearby node extracted by the node extraction means as the starting point or end point of a route interval search that makes use of the transportation network.

11. The route-searching method according to claim 9, wherein the route-searching system having node extraction means, the route searching method further comprising the steps of:

comparing using the node extraction means the time zone of the nearby node retrieved by the node retrieval means and the time zone of the point determined by the time zone determination means, and extracts a nearby node that belongs to the same time zone as the time zone of the point determined by the time zone determination means; and carrying out using the route-searching means carries out a route search using the nearby node extracted by the node extraction means as the starting point or end point of a route interval search that makes use of the transportation network.

12. The route-searching method according to claim 7, wherein the route-searching system having node retrieval means for retrieving a nearby node within a predetermined distance range relatively near to the point set by the point setting means, the route-searching method further comprising the step of:

carrying out using route-searching means a route search in which all nearby nodes retrieved by the node retrieval means are used as the starting point or end point of a route interval search that makes use of the transportation network.

* * * * *